(12) United States Patent
Deshpande et al.

(10) Patent No.: US 12,118,556 B2
(45) Date of Patent: Oct. 15, 2024

(54) DATABASE CONFIGURATION FOR ASSET TRANSFERS

(71) Applicant: International Business Machines Corporation, Armonk, NY (US)

(72) Inventors: Pralhad Dinesh Deshpande, Singapore (SG); Muhammad Tayyab Asif, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 16/121,991

(22) Filed: Sep. 5, 2018

(65) Prior Publication Data

US 2020/0074470 A1    Mar. 5, 2020

(51) Int. Cl.
| | |
|---|---|
| *H04L 9/00* | (2022.01) |
| *G06Q 20/06* | (2012.01) |
| *G06Q 20/24* | (2012.01) |
| *G06Q 20/38* | (2012.01) |
| *G06Q 20/40* | (2012.01) |
| *H04L 9/06* | (2006.01) |
| *H04L 9/40* | (2022.01) |
| *H04L 67/60* | (2022.01) |

(52) U.S. Cl.
CPC ......... *G06Q 20/4016* (2013.01); *G06Q 20/06* (2013.01); *G06Q 20/24* (2013.01); *G06Q 20/382* (2013.01); *H04L 9/0637* (2013.01); *H04L 63/101* (2013.01); *H04L 63/102* (2013.01); *H04L 67/60* (2022.05); *G06F 2221/2141* (2013.01); *H04L 9/50* (2022.05)

(58) Field of Classification Search
CPC .... G06Q 20/4016; G06Q 20/06; G06Q 20/24; G06Q 20/382; H04L 9/0637; H04L 63/101; H04L 63/102; H04L 67/32; H04L 2209/38; G06F 2221/2141
See application file for complete search history.

(56) References Cited

U.S. PATENT DOCUMENTS

| | | | |
|---|---|---|---|
| 9,870,562 B2 | 1/2018 | Davis et al. | |
| 10,055,715 B1 * | 8/2018 | Grassadonia | ...... G06Q 20/3674 |
| 10,114,854 B2 * | 10/2018 | Batra | ...... G06F 16/27 |
| 2015/0066755 A1 * | 3/2015 | ElBizri | ...... G06Q 20/102 |
| | | | 705/40 |
| 2016/0342976 A1 | 11/2016 | Davis | |

(Continued)

FOREIGN PATENT DOCUMENTS

| | | |
|---|---|---|
| WO | 201798519 A1 | 6/2017 |
| WO | 2017145003 A1 | 8/2017 |
| WO | 201806056 A1 | 1/2018 |

OTHER PUBLICATIONS

Fabricdocs Documentation, Release 1.0, rameshthoomu, Feb. 15, 2017 (Year: 2017).*

*Primary Examiner* — Mike Anderson
*Assistant Examiner* — Matthew Cobb

(57) ABSTRACT

An example operation may include one or more of receiving, by a blockchain node of a permissioned blockchain network, a request to transfer an asset from an asset provider to an asset requester, determining the request is valid, and in response validating one or more of an asset requester and an asset provider associated with the request, determining a risk exposure associated with the request is acceptable and generating a blockchain transaction to a public blockchain network to transfer the asset.

14 Claims, 15 Drawing Sheets

(56) References Cited

U.S. PATENT DOCUMENTS

| | | | |
|---|---|---|---|
| 2016/0342984 A1* | 11/2016 | Thomas | G06Q 20/027 |
| 2016/0342989 A1 | 11/2016 | Davis | |
| 2017/0011460 A1 | 1/2017 | Molinari et al. | |
| 2017/0046651 A1* | 2/2017 | Lin | H04L 9/0861 |
| 2017/0046693 A1* | 2/2017 | Haldenby | G06Q 20/4016 |
| 2017/0046698 A1* | 2/2017 | Haldenby | H04L 9/0891 |
| 2017/0230375 A1* | 8/2017 | Kurian | G06Q 20/382 |
| 2017/0244720 A1* | 8/2017 | Kurian | G06Q 40/00 |
| 2018/0075453 A1* | 3/2018 | Durvasula | G06Q 20/10 |
| 2018/0113752 A1 | 4/2018 | Derbakova et al. | |
| 2018/0130158 A1* | 5/2018 | Atkinson | G06Q 10/08 |
| 2018/0268401 A1* | 9/2018 | Ortiz | G06Q 20/326 |
| 2018/0285839 A1* | 10/2018 | Yang | H04L 9/3239 |
| 2018/0293557 A1* | 10/2018 | Kim | G06Q 20/14 |
| 2018/0300382 A1* | 10/2018 | Madisetti | H04L 9/0637 |
| 2019/0102736 A1* | 4/2019 | Hudson | G06Q 10/0875 |
| 2019/0311337 A1* | 10/2019 | Madisetti | G06Q 20/38215 |
| 2020/0007513 A1* | 1/2020 | Gleichauf | G06F 21/105 |
| 2020/0042982 A1* | 2/2020 | Snow | H04L 9/3239 |

* cited by examiner 120, 124

DATABASE CONFIGURATION FOR ASSET TRANSFERS

TECHNICAL FIELD

This application generally relates to a database storage system, and more particularly, to a database configuration for asset transfers.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by having a single point of failure since all transactions must utilize the centralized database. As such, what is needed is a solution to overcome these significant drawbacks.

SUMMARY

One example embodiment provides a system that includes a permissioned blockchain network and a public blockchain network, coupled to the permissioned blockchain network. The permissioned blockchain network includes one or more asset requesters and asset providers, and is configured to perform one or more of receive a request to transfer an asset from an asset provider to an asset requester, determine the request is valid, and in response validate one or more of the asset requester and asset provider associated with the request, determine a risk exposure associated with the request is acceptable, and generate a blockchain transaction to transfer the asset. The public blockchain network is configured to receive the blockchain transaction to transfer the asset and execute the blockchain transaction.

Another example embodiment provides a method that includes one or more of receiving, by a blockchain node of a permissioned blockchain network, a request to transfer an asset from an asset provider to an asset requester, determining the request is valid, and in response validating one or more of an asset requester and an asset provider associated with the request, determining a risk exposure associated with the request is acceptable, and generating a blockchain transaction to a public blockchain network to transfer the asset.

A further example embodiment provides a non-transitory computer readable medium comprising instructions, that when read by a processor, cause the processor to perform one or more of receiving, by a blockchain node of a permissioned blockchain network, a request to transfer an asset from an asset provider to an asset requester, determining the request is valid, and in response validating one or more of an asset requester and an asset provider associated with the request, determining a risk exposure associated with the request is acceptable, and generating a blockchain transaction to a public blockchain network to transfer the asset.

DETAILED DESCRIPTION

Figure 1A:
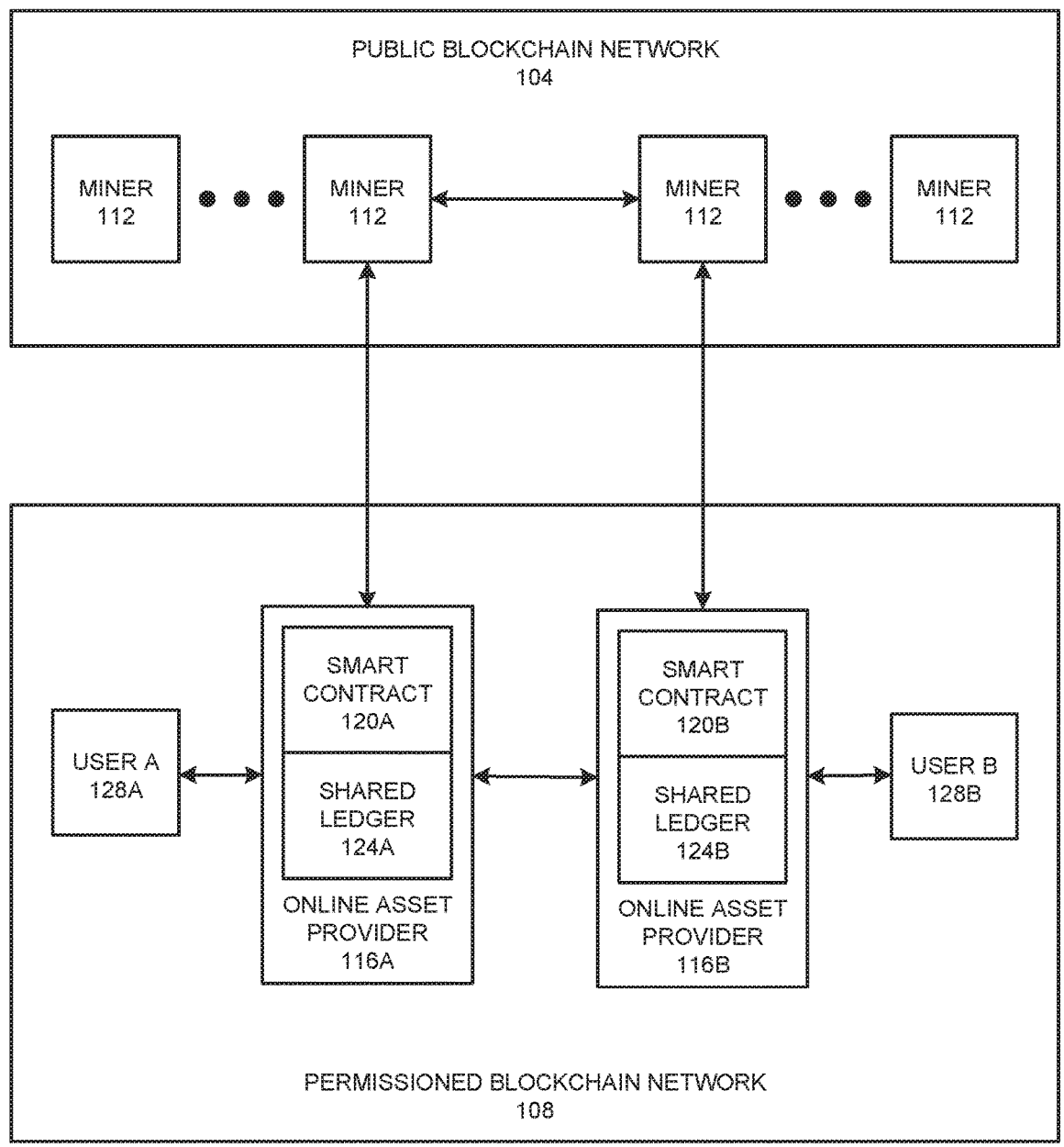
FIG. 1A illustrates a network diagram of a hybrid blockchain network configuration, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide a unique database configuration for asset transfers.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include improved transaction processing performance compared to conventional systems. Public blockchain networks are known to have low transaction throughputs, for example 10 transactions per second, and only provide probabilistic guarantees on processing transactions. Thus, fast payments are not possible on the public blockchain networks. The present application enables fast payments by leveraging a permissioned blockchain network between online asset providers, and may be capable of processing approximately 10,000 transactions per second.

Current public blockchain networks are eventually consistent. They do not offer explicit transaction completion guarantees nor acknowledgements. A blockchain may fork and the transactions on the losing fork are simply lost. The probability that transactions captured in a certain block will remain in the blockchain increases when new blocks are added to the chain that includes the transaction. As a rule of thumb, it is considered that after six blocks the probability that a transaction will be removed from the blockchain is very low.

In public blockchain networks used for asset transfers, Proof-of-Work consensus ensures eventual consistency in processing transactions. However, there is no acknowledgement of successfully processed transactions. Most participants deem a transaction as processed after receiving six confirmations, i.e., after six blocks have been mined after the transaction has been included in the blockchain. This takes on average 60 minutes (10 minutes per block), which is very slow. For example, the popular Bitcoin network can process seven transactions/second.

A blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the transaction performance improvement is implemented due to an immutable account of I owe you (IOU) messages, which are inherent and unique to blockchain networks. In particular, an immutable account of the IOU messages are stored on a permissioned blockchain after achieving consensus among participating nodes. Asset transfer networks are invariably public blockchain networks. However, by migrating the majority of asset transfer process steps to a permissioned blockchain network, such as Hyperledger fabric, significant delays on the public network may be avoided.

One of the benefits of the example embodiments is that it improves the functionality of a computing system by improving transaction processing speed. Through the blockchain system described herein, a computing system can perform transaction processing functionality significantly faster than conventional approaches because of improved validation and consensus protocols in permissioned blockchain networks compared to public blockchain networks.

The example embodiments provide numerous benefits over a traditional database. For example, through the blockchain the embodiments provide decentralized operation and faster transaction processing, without requiring any modifications to existing public asset transfer networks. Meanwhile, a traditional database could not be used to implement the example embodiments because conventional databases do not provide shared ledgers and smart contracts that keep track of important asset transfer parameters. Accordingly, the example embodiments provide for a specific solution to a problem in the arts/field of asset transfers between networked entities.

The example embodiments also change how data may be stored within a block structure of the blockchain. For example, asset netting and settlement parameters may be stored within smart contracts or shared ledgers (i.e., header, data segment, or metadata) of the data block. By storing the asset netting and settlement parameters, in addition to user blacklists and risk exposure parameters, within data blocks of a blockchain, the asset transfer transactions may be appended to an immutable ledger through a hash-linked chain of blocks. In some embodiments, the data block may be different than a traditional data block by including any of asset netting and settlement parameters, user blacklists, and risk exposure parameters of a blockchain.

FIG. 1A illustrates a network diagram of a hybrid blockchain network configuration, according to example embodiments. Referring to FIG. 1A, the network 100 includes a public blockchain network 104 and a permissioned blockchain network 108. The public blockchain network 104 is generally an existing public blockchain network 104, such as a cryptocurrency or bitcoin blockchain network. Public blockchain network 104 includes a plurality of nodes, including nodes that act as miners 112. Miners 112 keep the blockchain consistent, complete, and unalterable by repeatedly grouping newly broadcast transactions into a block, which is then broadcast to the network and verified by recipient nodes. Each block contains a SHA-256 cryptographic hash of the previous block, thus linking it to the previous block and giving the blockchain its name.

To be accepted by the rest of the network, a new block must contain a proof-of-work (PoW). The system used is based on Adam Back's 1997 anti-spam scheme, Hashcash. The PoW requires miners to find a number called a nonce, such that when the block content is hashed along with the nonce, the result is numerically smaller than the network's difficulty target. This proof is easy for any node in the network to verify, but extremely time-consuming to generate, as for a secure cryptographic hash, miners must try many different nonce values (usually the sequence of tested values is the ascending natural numbers: 0, 1, 2, 3, . . . before meeting the difficulty target. Every 2,016 blocks (approximately 14 days at roughly 10 min per block), the difficulty target is adjusted based on the network's recent performance, with the aim of keeping the average time between new blocks at ten minutes. In this way, the system automatically adapts to the total amount of mining power on the network. Between Mar. 1, 2014 and Mar. 1, 2015, the average number of nonces miners had to try before creating a new block increased from 16.4 quintillion to 200.5 quintillion. The proof-of-work system, alongside the chaining of blocks, makes modifications of the blockchain extremely hard, as an attacker must modify all subsequent blocks in order for the modifications of one block to be accepted. As new blocks are mined all the time, the difficulty of modifying a block increases as time passes and the number of subsequent blocks (also called confirmations of the given block) increase.

The network 100 also includes a permissioned blockchain network 108, such as Hyperledger Fabric. In one embodiment, the permissioned blockchain network 108 already exists and conducts transactions between blockchain peers for existing purposes. In another embodiment, the permissioned blockchain network 108 is a newly created network to facilitate various forms of asset transfers between clients or peers/nodes.

The permissioned blockchain network 108 includes various online asset providers 116, which are blockchain peers that keep track of asset transfers within the permissioned blockchain network 108 as described herein. Two online asset providers 116 are shown, identified as online asset provider 116A and online asset provider 116B. Any number of online asset providers 116 may be present in the permissioned blockchain network 108.

Each online asset provider 116 includes a smart contract 120 and a shared ledger 124. Online asset provider 116A includes a smart contract 120A and a shared ledger 124A, while online asset provider 116B includes a smart contract 120B and a shared ledger 124B. A smart contract 120 is a computer protocol intended to digitally facilitate, verify, or enforce the negotiation or performance of a contract. Smart contracts 120 allow the performance of credible transactions without third parties. These transactions are traceable and irreversible. A shared or distributed ledger 124 stores a consensus of replicated, shared, and synchronized digital data and blockchain transactions. Both smart contracts 120 and shared or distributed ledgers 124 are described in more detail herein.

Users 128 are each associated with a specific online asset provider 116. In some embodiments, different users 128 utilize different online asset providers 116. In other embodiments, different users 128 may utilize a same online asset provider 116. FIG. 1A illustrates a case where a user 128A is associated with online asset provider 116A while a different user 128B is associated with a different online asset provider 116B. Users 128 interact to transfer asset ownership between each other in some agreed fashion, such as a temporary or permanent trade or payment.

In one embodiment, online asset providers 116 may be online wallet providers 116 such as XAPO® or COINBASE®. A wallet may be used to store the information necessary to transact cryptocurrency transfers or payments. Wallets store digital credentials required for asset transfers and maintain current asset inventories. For example, third-party internet services called online wallets store credentials to access funds with the online wallet provider rather than on the user's hardware. As a result, the user must have complete trust in the online wallet provider.

Figure 1B:
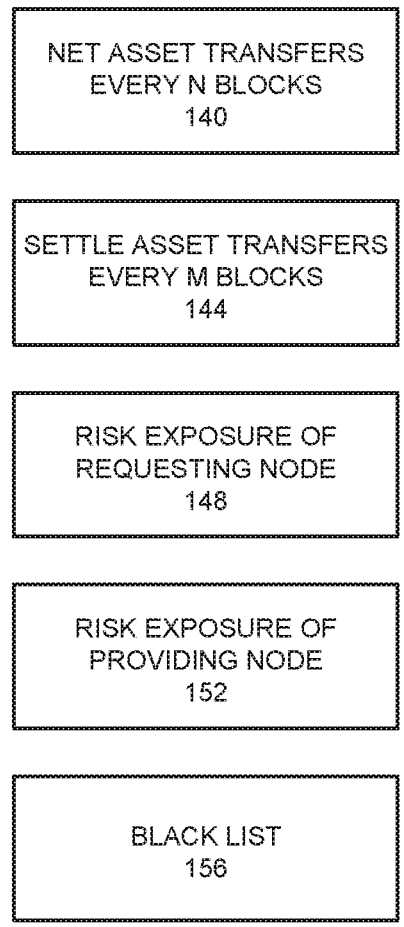
FIG. 1B illustrates parameters stored in smart contracts and shared ledgers, according to example embodiments.

FIG. 1B illustrates parameters stored in smart contracts 120 and shared ledgers 124, according to example embodiments. Referring to FIG. 1B, the smart contracts 120 or shared ledgers 124 includes several parameters included in the processes of the present application.

Asset transfers may be made between many nodes (online asset providers 116) and at various unpredictable times in the permissioned blockchain network 108. In many embodiments, it may be desirable to net transfers between the various online asset providers 116, so that a current and accurate view of overall transfers is available. Therefore, a net asset transfers every N blocks parameter 140 may be used to determine when a net or netting operation needs to be performed. 'N' designates an integer number of blocks that will be enforced between the net/netting operations.

Asset transfers must be regularly settled between users 128, using the public blockchain network 104. Settlement operations initiate the actual transfer of ownership of an asset. A settle asset transfers every M blocks parameter 144 may be used to determine when a settlement operation needs to be performed. 'M' designates an integer number of blocks that will be enforced between the settlement operations.

Risk exposure parameters 148, 152 may be present in some embodiments in order to calculate whether the size of a particular asset transfer is greater than or less than a corresponding risk exposure for requesting nodes 148 or providing nodes 152. If the risk exposure is greater than the size of a corresponding asset transfer, the asset transfer would be allowed to continue. However, if the risk exposure is less than the size of a corresponding asset transfer, the asset transfer would be disallowed. Risk exposure in most embodiments is a predetermined parameter and may be determined by each of the requesting 148 or providing 152 nodes or by a $3^{rd}$ party.

Smart contracts 120 or shared ledgers 124 may also include a black list 156 of users 128. In one embodiment, users 128 that are requesting nodes and on the black list 156 are blocked from participating in asset transfers. In another embodiment, users 128 that are providing nodes and on the black list 156 are blocked from participating in asset transfers. In yet another embodiment, users 128 that are either requesting nodes or providing nodes and on the black list 156 are blocked from participating in asset transfers. Users 128 in a black list 156 have been previously determined to be dishonest participants.

Figure 2A:
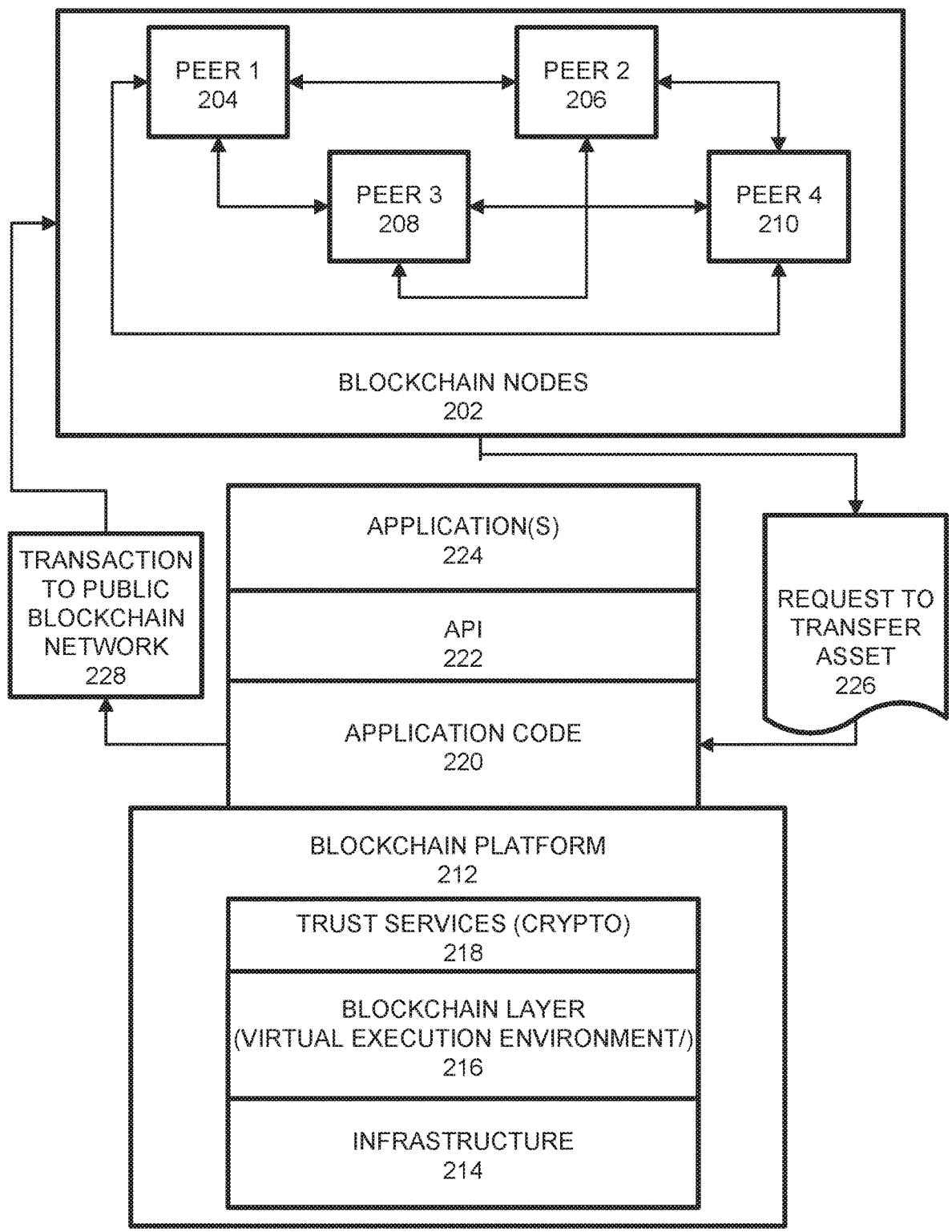
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information 226 may include a request to transfer an asset and may be processed by one or more processing entities (e.g., virtual machines) included in the blockchain layer 216. The result 228 may include one or more transactions to transfer an asset sent to a public blockchain network. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by blockchain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, associated with the request to transfer the asset is an identification of a requesting node and a providing node, both part of an existing or new permissioned blockchain network. One function may be to initiate settlement on a public blockchain network by instantiating one or more settlement blockchain transactions, which may be provided to one or more of the nodes 204-210.

Figure 2B:
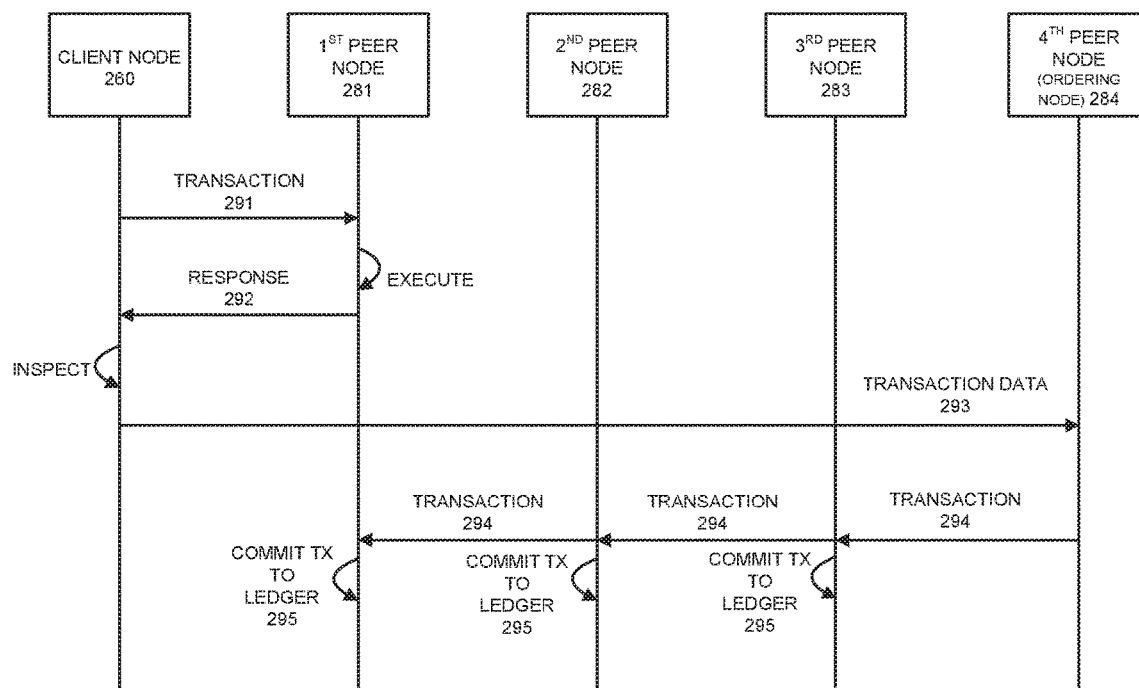
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
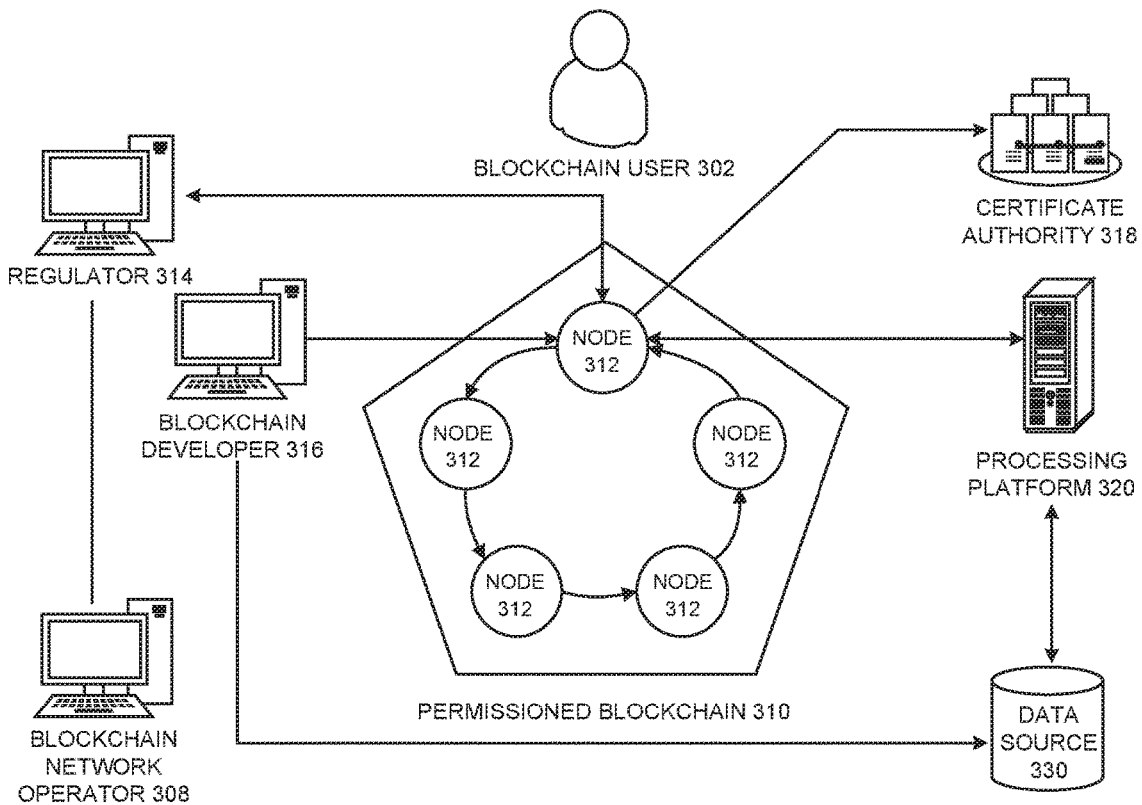
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
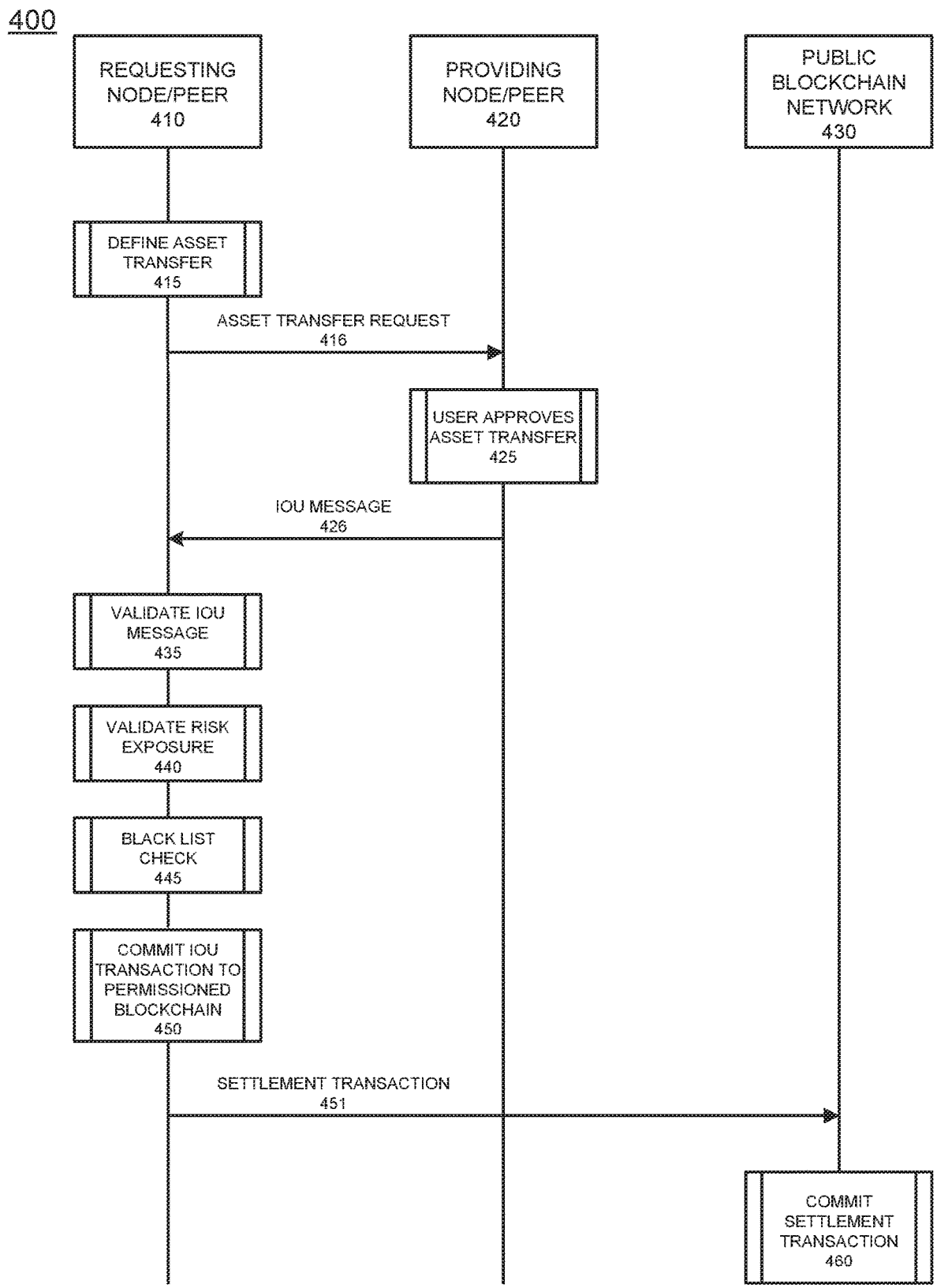
FIG. 4 illustrates a system messaging diagram for performing asset transfers between permissioned and public blockchain networks, according to example embodiments.

FIG. 4 illustrates a system messaging diagram for performing asset transfers between permissioned and public blockchain networks, according to example embodiments.

Referring to FIG. 4, the system diagram 400 includes a requesting node or peer 410, a providing node or peer 420, and a public blockchain network 430. Each of the requesting node or peer 410 and providing node or peer 420 are part of a permissioned blockchain network 108.

The requesting node or peer 410 initiates the process of the present application when a user 128 defines an asset transfer 415. The asset transfer is a request, and includes an ID of the requesting node or peer 410, an ID of the providing node or peer 420, an identification of the asset itself, and an amount of the asset. After defining the asset transfer 415, the requesting node or peer 410 sends an asset transfer request 416 to the providing node or peer 420.

The providing node or peer 420 receives the request 416 and presents the request 416 to a user 128 associated with the providing node or peer 420. The user 128 approves the asset transfer 425, and the providing node or peer 420 sends an IOU message 426 back to the requesting node or peer 410. In some embodiments, if the user 128 associated with the providing node or peer 420 rejects the asset transfer, the providing node or peer 420 sends a rejection notification to the requesting node or peer 410. Netting is a process of accumulating all pending IOU messages among entities and determining the sum total of how much each entity owes the other entities.

The requesting node or peer 410 receives the IOU message 426 and validates the IOU message 435. The IOU message 426 specifies an amount of assets to be transferred. The requesting node 410 next validates risk exposure 440 for the transaction by comparing either or both of the requesting node risk exposure 148 or providing node risk exposure 152 to the amount of assets to be transferred, as described with reference to FIG. 1B. Assuming the risk exposure is acceptable, the requesting node or peer 410 then checks the black list 445 for the other party (providing node or peer 420) to make sure the other party in the asset transfer is reliable.

After the various checks 435, 440, 445 have been made, the requesting node or peer 410 next commits an IOU transaction to the permissioned blockchain 450. The IOU transaction will then be validated as per established permissioned blockchain practices and procedures, and committed to shared ledgers 124 on the permissioned blockchain network 108. The requesting node or peer 410 then determines that asset transfer settlement needs to occur based on the settle asset transfers every M blocks parameter 144, and in response generates a settlement transaction 451 to the public blockchain network 430. Finally, the public blockchain network 430 receives the settlement transaction 451 and commits the settlement transaction 460 to the public blockchain network 430.

Figure 5A:
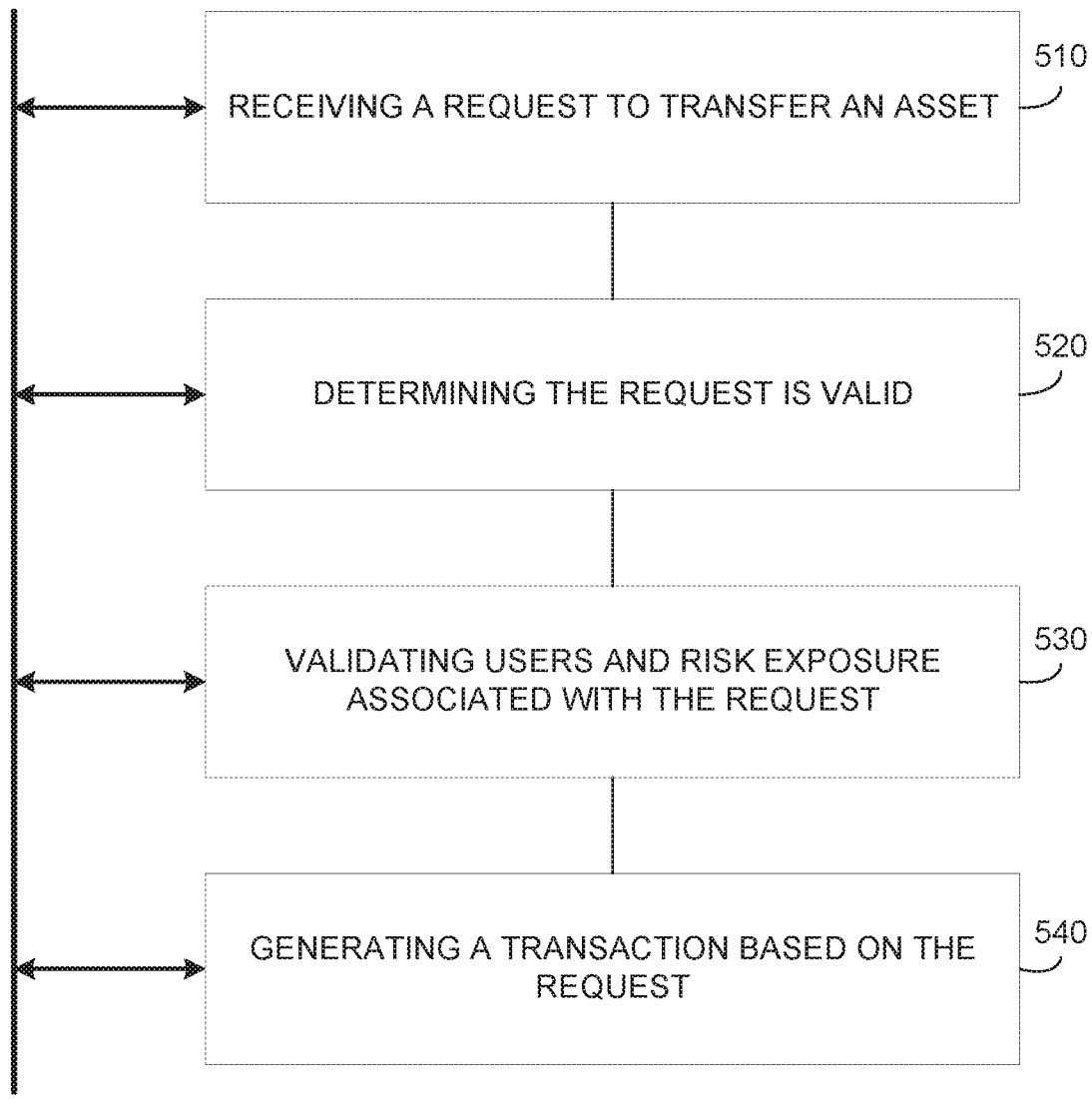
FIG. 5A illustrates a flow diagram of an example method of processing inter-blockchain transactions on a blockchain, according to example embodiments.

FIG. 5A illustrates a flow diagram 500 of an example method of processing inter-blockchain transactions on a blockchain, according to example embodiments. Referring to FIG. 5A, the method 500 may include receiving a request to transfer an asset 510. The asset is transferred between online asset providers 116 on a permissioned blockchain network 108. In one embodiment, the online asset providers 116 are online wallet providers 116, and specific users have accounts with one or more online wallet providers 116. Each of the online asset providers 116 may be associated with different users 128, and the asset may include (but is not limited to any tangible resource, including cryptocurrency, a product, a natural resource, or time credits.

After the request to transfer the asset is received 510, the request is determined to be valid, or not 520. Invalid requests are rejected and not processed, and generally include an incorrect format or incorrect parameters.

If the request is found to be valid, the users 128 associated with the asset transfer are validated by checking identities of one or both users against a black list 156 and determining if risk exposure associated with the request 530 is acceptable. These checks were previously discussed relative to FIGS. 1B and 4.

Finally, if the various checks have passed, transactions are generated based on the request 540. A permissioned blockchain transaction to generate an IOU transaction is committed on the permissioned blockchain network 108 and a public blockchain transaction is committed on the public blockchain network 104. In this way, messaging, approval/validating, and netting operations occur on a faster permissioned blockchain network 108 and only the settlement itself occurs on the slower public blockchain network 104. This has the net result of increasing transaction throughput for asset transfers by offloading many of the steps to a faster permissioned blockchain network 108.

Figure 5B:
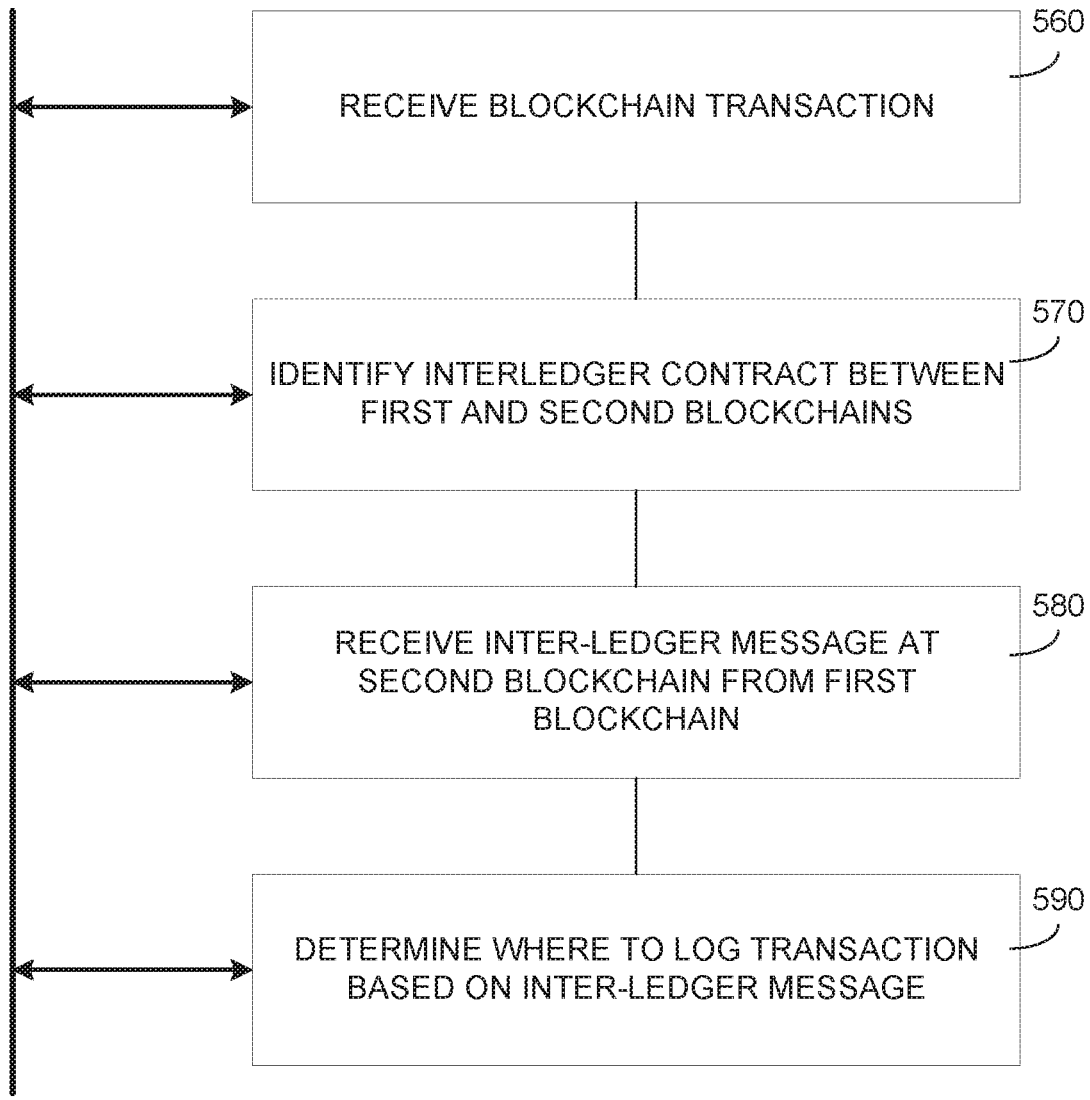
FIG. 5B illustrates a flow diagram of an example method of processing inter-blockchain transactions in a blockchain, according to example embodiments.

FIG. 5B illustrates a flow diagram 550 of an example method of processing inter-blockchain transactions in a blockchain, according to example embodiments. The method may include receiving a blockchain transaction sent from a first blockchain to a second blockchain 560. The method may include using messages either stored or sent from one block in one of the blockchains to another to verify a transaction. The blocks may have messages which identify another blockchain, a specific transaction, parties to the transaction or other transaction-specific information.

The method may also include identifying an inter-ledger contract between the first blockchain and the second blockchain 570. The inter-ledger messages and contracts may be verified with one or more messages stored in the blocks. The message may be a favorable message or an unfavorable message that indicates whether the transaction is sent or received in the correct blockchain and whether the transaction should be written to a specific block or blockchain.

The method may also include receiving an inter-ledger message at the second blockchain from the first blockchain 580. The inter-ledger messaging may assist with communicating between the various blockchains without requiring a common consensus procedure. The method may also include establishing a ledger share agreement between the first blockchain and the second blockchain, and transmitting an inter-ledger confirmation message confirming the ledger share agreement. The ledger share agreement may include any of a block model, a cryptography type, a verification procedure, and a consensus procedure. The method may also provide parsing the blockchain transaction at the first blockchain to retrieve identifiers, metadata, transaction information, etc., and identifying one or more identifiers associated with the second blockchain or a third or other blockchain.

Finally, the method may also include determining whether to log the blockchain transaction in the first blockchain or the second blockchain based on the inter-ledger message 590. The method may also provide determining to log the transaction in the second blockchain based on the one or more identifiers, and logging the transaction in the second blockchain. The method may also include identifying one or more consensus procedures accepted by the first blockchain and the second blockchain to be used for the blockchain transaction, and identifying a third blockchain referenced by the inter-ledger message, and transmitting another inter-ledger message to the third blockchain to log a portion of the blockchain transaction in the third blockchain.

Figure 6A:
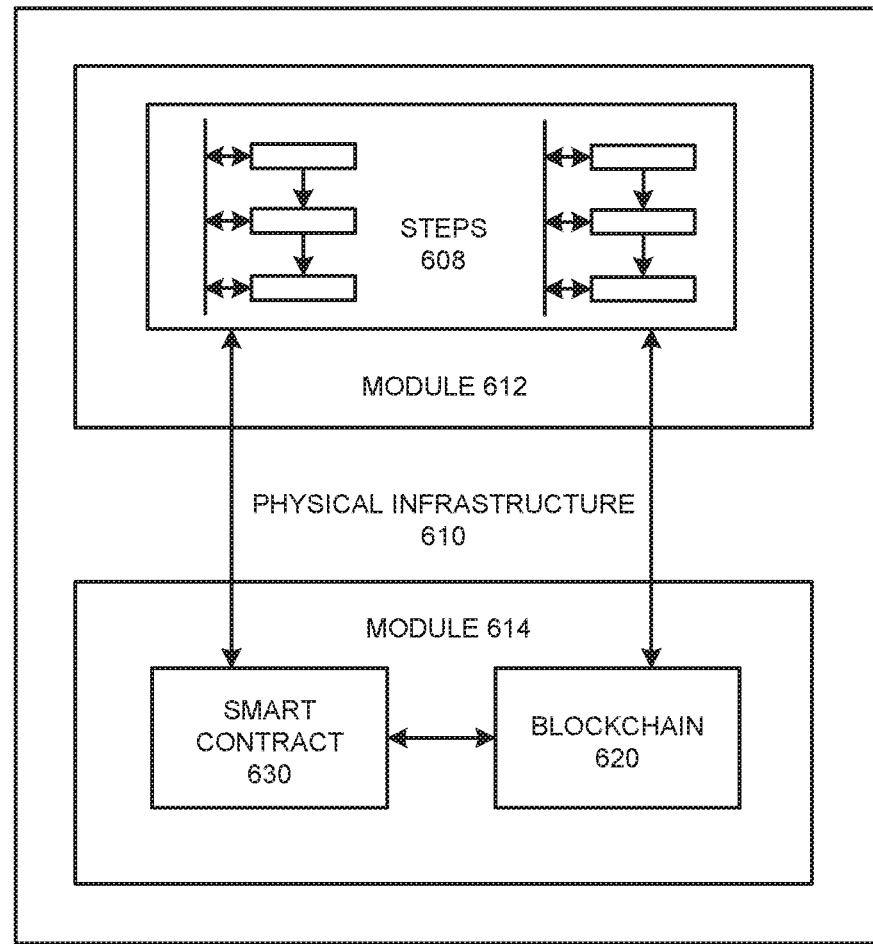
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
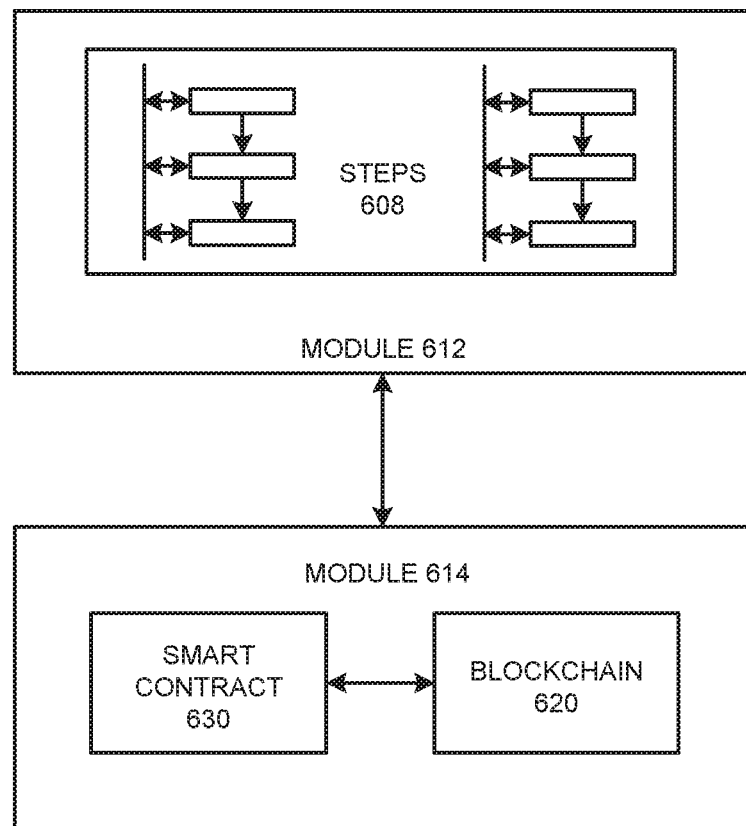
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
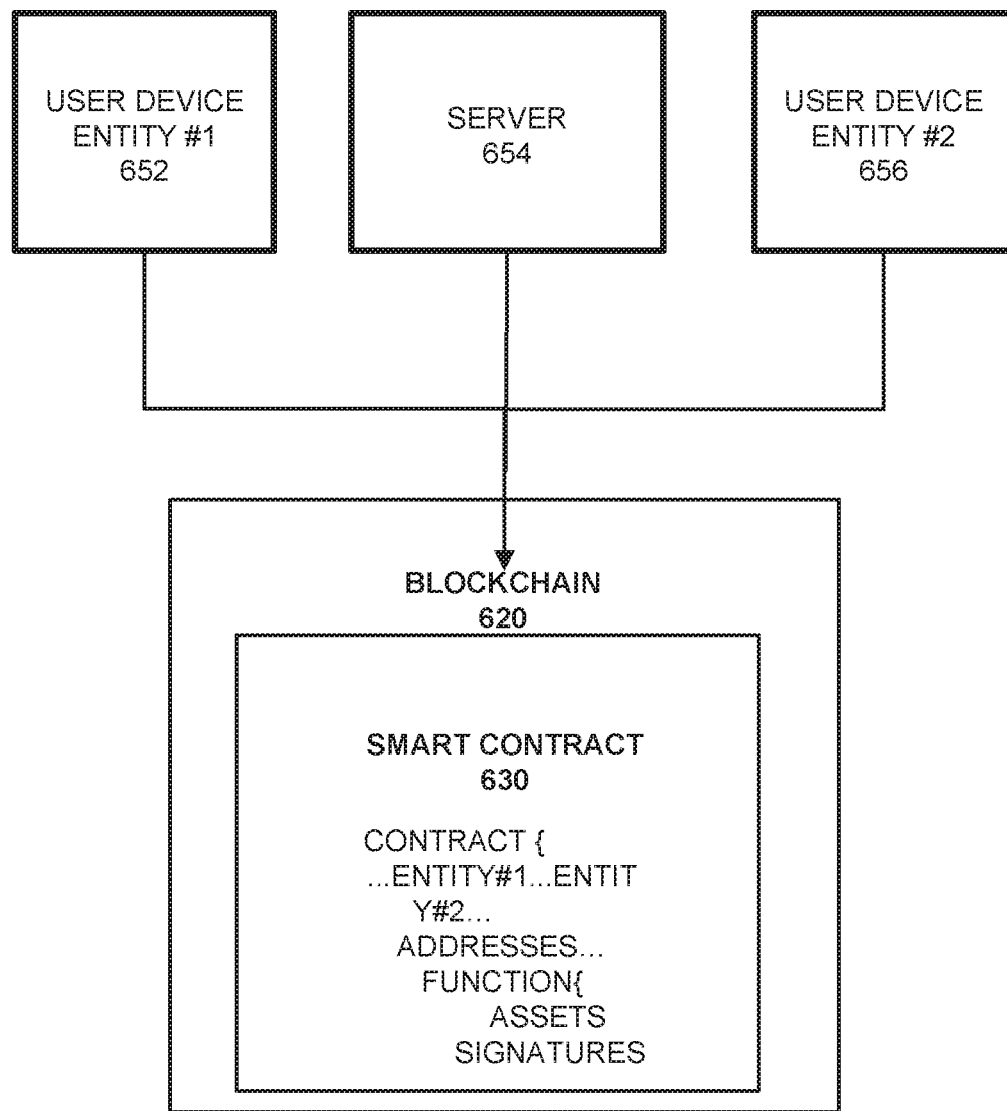
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
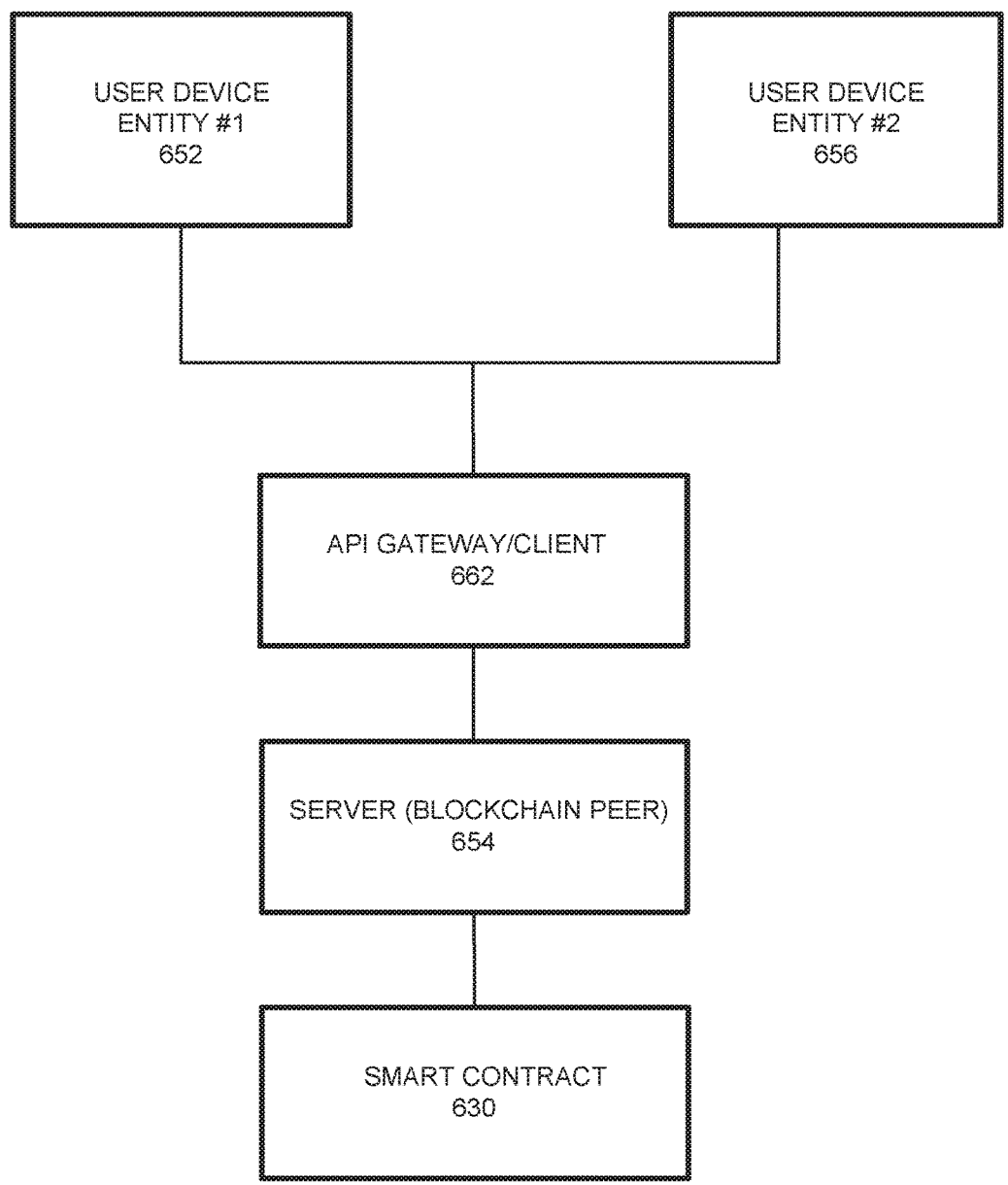
FIG. 6D illustrates another additional example system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7A illustrates an example computer system architecture 700, which may represent or be integrated in any of the above-described components, etc.

Figure 7A:
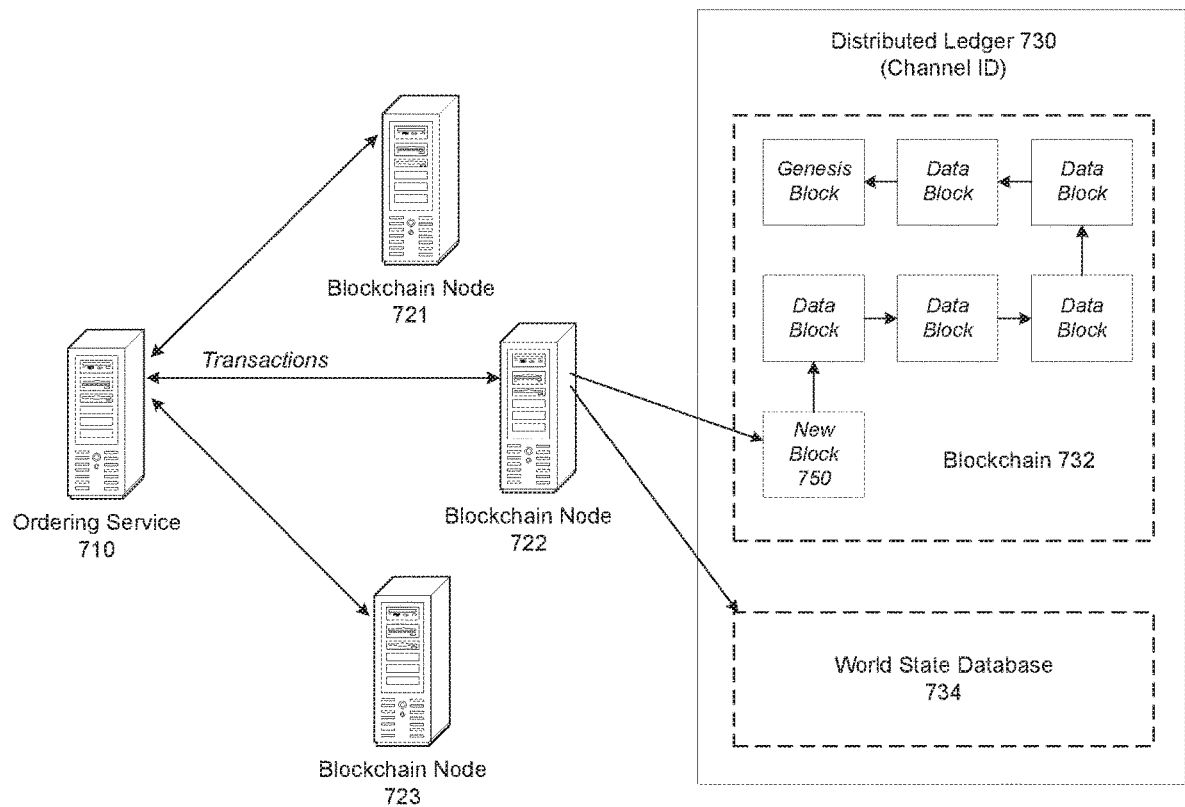
FIG. 7A illustrates a process of new data being added to a database, according to example embodiments.
Figure 7B:
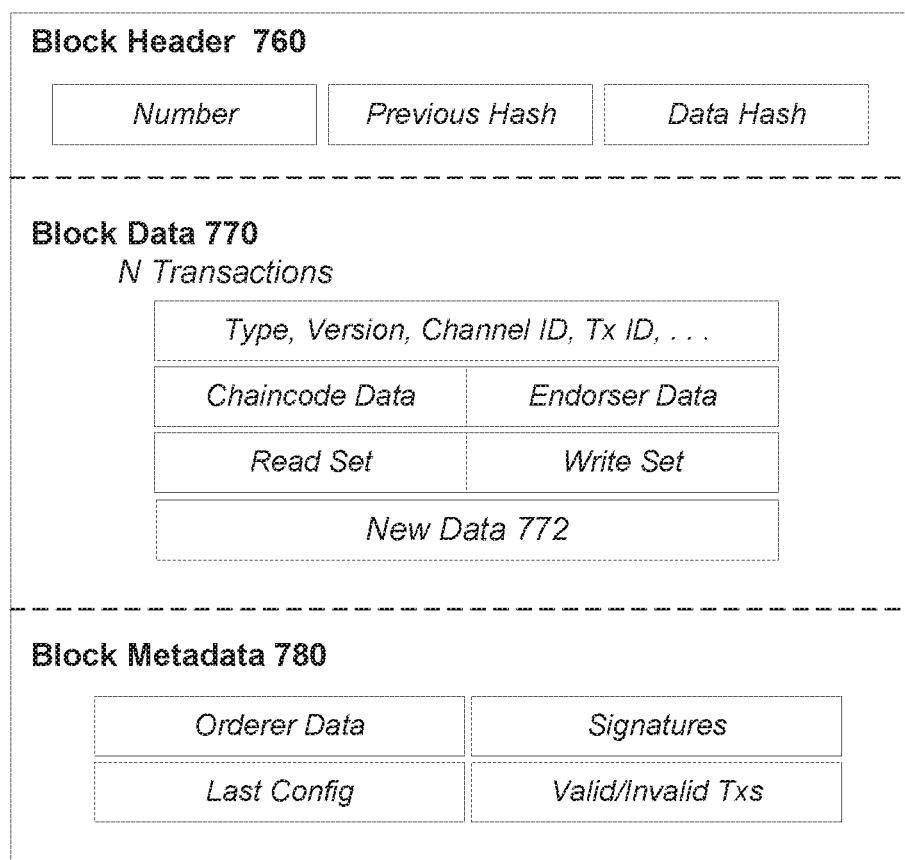
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, a request to transfer an asset from a providing asset provider to a requesting asset provider, and the like. The transaction data may be stored for each of the N transactions.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
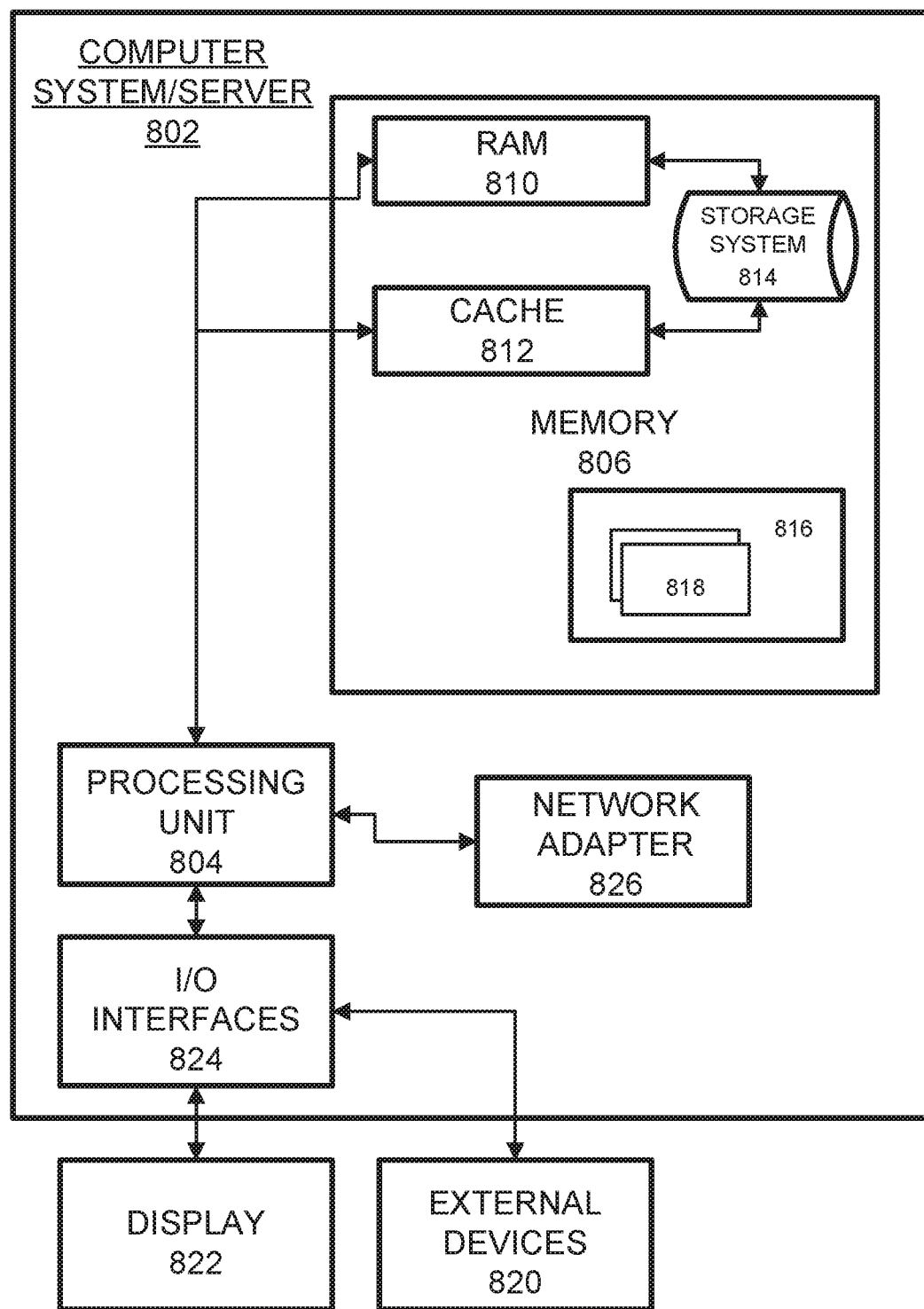
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed.

Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor configured to:
receive, via a peer of a permissioned blockchain of a second blockchain network, a request to transfer an asset on a public blockchain of a first blockchain network from an asset provider;
receive, via the peer of the permissioned blockchain of the second blockchain network, an I owe you (IOU) message from an asset requester, the IOU message identifying an obligation between the asset requester and the asset provider for the asset on the public blockchain of the first blockchain network;
accumulate the IOU message with one or more other IOU messages to create a net obligation, and store the net obligation via a netting transaction on the permissioned blockchain of the second blockchain network;
determine to perform a settlement operation of the net obligation based on a block parameter which specifies a plurality of blocks to be stored on the permissioned blockchain in between settlement operations; and
in response to the determination, generate a settlement transaction for settling the net obligation via the peer of the second blockchain network and transmitting the settlement transaction to a peer of the first blockchain network to perform actual transfer of the asset on the public blockchain.

2. The system of claim 1, wherein the processor is configured to generate and transmit the settlement transaction every M number of blocks stored on the public blockchain since a last settlement transaction.

3. The system of claim 1, wherein the processor is further configured to determine whether at least one of the asset requester and the asset provider are on an exclusionary list, and reject generation of the netting transaction for the permissioned blockchain network based on the check.

4. The system of claim 1, wherein the processor is configured to accumulate uncompleted asset transfer requests for the permissioned blockchain, determine a sum total of owed asset transfers for all nodes of the second blockchain network associated with one or more uncompleted asset transfer requests, and include the sum total within the netting transaction that is transmitted to the first blockchain network.

5. The system of claim 1, wherein the processor is configured to:
obtain a settlement operation parameter; and
in response to determining a number of blocks committed since a last settlement operation is equal to the settlement operation parameter, submit the settlement transaction to the first blockchain network.

6. A method, comprising:
receiving, by a blockchain peer of a permissioned blockchain of a second blockchain network, a request to transfer an asset on a public blockchain of a first blockchain network from an asset provider;
receiving, by the blockchain peer of the permissioned blockchain of the second blockchain network, an I owe you (IOU) message from an asset requester, the IOU message identifying an obligation between the asset requester and the asset provider for the asset on the public blockchain of the first blockchain network;
accumulating the IOU message with one or more other IOU messages to create a net obligation, and store the net obligation via a netting transaction on the permissioned blockchain of the second blockchain network;
determining to perform a settlement operation of the net obligation based on a block parameter which specifies a plurality of blocks to be stored on the permissioned blockchain in between settlement operations; and
in response to the determination, generating a settlement transaction for settling the net obligation via the blockchain peer of the second blockchain network and transmitting the settlement transaction to a peer of the first blockchain network to perform actual transfer of the asset on the public blockchain.

7. The method of claim 6, wherein the generating and the transmitting comprises generating and transmitting the settlement transaction every M number of blocks stored on the public blockchain since a last settlement transaction.

8. The method of claim 6, further comprising:
determining whether at least one of the asset requestor and the asset provider are on an exclusionary list, and
rejecting generation of the netting transaction for the permissioned blockchain network based on the check.

9. The method of claim 6, wherein the accumulating comprises accumulating uncompleted asset transfer requests for the permissioned blockchain network, determining a sum total of owed asset transfers for all nodes of the second blockchain network associated with one or more uncompleted asset transfer requests, and including the sum total within the netting transaction that is transmitted to the first blockchain network.

10. The method of claim 6, further comprising:
obtaining a settlement operation parameter from the second blockchain network; and
in response to determining that a number of blocks committed since a last settlement operation is equal to the settlement operation parameter, submitting the settlement transaction to the first blockchain network.

11. A non-transitory computer readable medium comprising instructions, that when read by a processor, cause the processor to perform a method comprising:
receiving, by a blockchain peer of a permissioned blockchain of a second blockchain network, a request to transfer an asset on a public blockchain of a first blockchain network from an asset provider;
receiving, by the blockchain peer of the permissioned blockchain of the second blockchain network, an I owe you (IOU) message from an asset requester, the IOU message identifying an obligation between the asset requester and the asset provider for the asset on the public blockchain of the first blockchain network;
accumulating the IOU message with one or more other IOU messages to create a net obligation, and store the net obligation via a netting transaction on the permissioned blockchain of the second blockchain network;
determining to perform a settlement operation of the net obligation based on a block parameter which specifies a plurality of blocks to be stored on the permissioned blockchain in between settlement operations; and in response to the determination, generating a settlement transaction for settling the net obligation via the blockchain peer of the second blockchain network and transmitting the settlement transaction to a peer of the first blockchain network to perform actual transfer of the asset on the public blockchain.

12. The non-transitory computer readable medium of claim 11, wherein the generating and the transmitting comprises generating and transmitting the settlement transaction every M number of blocks stored on the public blockchain since a last settlement transaction.

13. The non-transitory computer readable medium of claim 11, wherein the accumulating comprises accumulating uncompleted asset transfer requests for the second blockchain network, determining a sum total of owed asset transfers for all nodes of the second blockchain network associated with one or more uncompleted asset transfer requests, and including the sum total within the netting transaction that is transmitted to the first blockchain network.

14. The non-transitory computer readable medium of claim 11, wherein the method further comprises:
   obtaining a settlement operation parameter from the second blockchain network; and
   in response to determining that a number of blocks committed since a last settlement operation is equal to the settlement operation parameter, submitting the settlement transaction to the first blockchain network.

* * * * *